US008327425B2

(12) United States Patent
Dawson et al.

(10) Patent No.: US 8,327,425 B2
(45) Date of Patent: *Dec. 4, 2012

(54) METHOD FOR ESTABLISHING AN AGENCY RELATIONSHIP TO PERFORM DELEGATED COMPUTING TASKS

(75) Inventors: Colin S. Dawson, Tucson, AZ (US); Glen Hattrup, Tucson, AZ (US); Avishai H. Hochberg, San Jose, CA (US); Michael Kaczmarski, Tucson, AZ (US); Thomas F. Ramke, Jr., Vonore, TN (US); James P. Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/821,920

(22) Filed: Jun. 23, 2010

(65) Prior Publication Data
US 2010/0263030 A1 Oct. 14, 2010

Related U.S. Application Data

(63) Continuation of application No. 10/987,478, filed on Nov. 12, 2007, now Pat. No. 7,774,462.

(51) Int. Cl.
*G06F 21/22* (2006.01)
(52) U.S. Cl. ............... 726/6; 726/2; 709/202; 709/228; 709/229; 709/225; 718/104; 711/100; 711/162; 707/646; 707/647; 707/645; 707/650; 707/651
(58) Field of Classification Search .................. 709/225, 709/228, 229, 202; 726/2; 718/204, 104; 711/162, 100
See application file for complete search history.

(56) References Cited

U.S. PATENT DOCUMENTS

| | | | |
|---|---|---|---|
| 5,001,628 A | 3/1991 | Johnson et al. | |
| 6,260,069 B1 | 7/2001 | Anglin | |
| 6,449,614 B1 | 9/2002 | Marcotte | |
| 6,584,582 B1 | 6/2003 | O'Connor | |
| 6,658,470 B1 | 12/2003 | deBardelaben | |
| 6,711,679 B1 | 3/2004 | Guski et al. | |
| 6,782,411 B2 | 8/2004 | Navare et al. | |

(Continued)

FOREIGN PATENT DOCUMENTS

| | | |
|---|---|---|
| EP | 0658848 A2 | 6/1995 |
| JP | 2003196135 | 7/2003 |
| WO | 03/075135 A1 | 9/2003 |

OTHER PUBLICATIONS

Hardjono T et al: "Secure Delegation of Tasks in Distributed Systems" Dec. 1, 1993, Tron Project International Symposium. 1993., The 10th Tokyo, Japan Dec. 1-2, 1993, Los Alamitos, CA, USA, IEEE Comput. Soc, pp. 98-112, XP010221233 ISBN: 0-8186-4580-6 the whole document.

(Continued)

*Primary Examiner* — Eleni Shiferaw
*Assistant Examiner* — Mohammad Siddiqi
(74) *Attorney, Agent, or Firm* — Kunzler Law Group PC

(57) ABSTRACT

A method is disclosed for establishing an agency relationship to perform delegated computing tasks. The method provides for initiation of the agency relationship, establishment of credentials to perform a delegated computing task, and performance of the delegated computing task. Benefits of establishing an agency relationship in a computing environment include improved security, efficiency, and reliability in performing delegated computing tasks.

20 Claims, 7 Drawing Sheets

U.S. PATENT DOCUMENTS

| | | | |
|---|---|---|---|
| 7,082,457 B1 * | 7/2006 | Burianek et al. | 709/204 |
| 7,082,600 B1 * | 7/2006 | Rau et al. | 717/148 |
| 7,174,433 B2 | 2/2007 | Kottomtharayil et al. | |
| 7,246,207 B2 | 7/2007 | Kottomtharayil et al. | |
| 7,343,356 B2 | 3/2008 | Prahlad et al. | |
| 7,454,569 B2 | 11/2008 | Kavuri et al. | |
| 7,774,462 B2 * | 8/2010 | Dawson et al. | 709/225 |
| 2002/0042823 A1 | 4/2002 | DeBettencourt et al. | |
| 2004/0186904 A1 * | 9/2004 | Oliveira | 709/225 |

OTHER PUBLICATIONS

Gasser M et al: "An Architecture for Practical Delegation in a Disturbed System" Proceedings of the Symposium on Research in Security and Privacy. Oakland, May 7-9, 1990, Los Alamitos, IEEE Comp. Soc. Press, US, vol. SYMP. 11, May 7, 1990, pp. 20-30, XP010020183 ISBN: 0-8186-2060-9 paragraph '00091.

* cited by examiner

METHOD FOR ESTABLISHING AN AGENCY RELATIONSHIP TO PERFORM DELEGATED COMPUTING TASKS

CROSS-REFERENCE TO RELATED APPLICATIONS

This is a continuation application of and claims priority to U.S. patent application Ser. No. 10/987,478 entitled "APPARATUS, SYSTEM, AND METHOD FOR ESTABLISHING AN AGENCY RELATIONSHIP TO PERFORM DELEGATED COMPUTING TASKS" and filed on Nov. 12, 2004 for Dawson et al., which is incorporated herein by reference.

BACKGROUND OF THE INVENTION

1. Field of the Invention

This invention relates to performance of computing tasks and more particularly relates to establishing an agency relationship to perform delegated computing tasks.

2. Description of the Related Art

There are many reasons that a need may arise for one computing device to delegate computing tasks to another computing device. Network resource management, hardware resource management, process scheduling, and security, and the like are examples of processes for which task delegation is desirable. When one computing device, network component, or component of a computing device requires assistance from another such device for improving efficiency, the need for delegation arises. Delegation as used herein means the assignment of responsibility for performing a computing task from one computing module or device (hereinafter node) to another node.

One example of an area in which delegation of computing tasks may be beneficial is network resource management. If one node on the network is operating under a disproportionately heavy load, when compared with other nodes on the network, the need for delegation arises. The overloaded node may delegate some of the tasks to be done to another network node that is not overloaded. In such an instance, the tasks can be accomplished more efficiently through the use of task delegation.

In a similar example, delegation provides more efficient use of computing device resources. A server may have multiple processors. If one of the processors is heavily loaded with a set of computing tasks, it may be beneficial to offload some of the computing tasks to one of the other processors. Delegation is therefore, a useful tool in balancing the amount of work to be done in both a network scope and a local machine scope.

Despite the usefulness of computing task delegation, currently some limitations exist. Security is an extremely important aspect of today's computing environment. In many situations, one node on a network may be burdened with a heavy task load, because that node is the only node authorized to perform the given tasks. Passwords and log-in ID are an important aspect of computer security. In many cases, a specific password is required to perform certain computing tasks. In order to maintain a secure computing environment, these passwords are often carefully protected. For delegation to work successfully, multiple nodes must possess the authorization required to perform a given set of delegated tasks. Therefore, it is often difficult to provide multiple nodes capable of performing delegated tasks and simultaneously maintain strict security policies.

One common solution to the authorization problem is to have a common password that a predetermined set of nodes possess, which can be used to perform a given set of computing tasks. By this method, known as masquerading, any one of the nodes possessing the password can perform the tasks. It is desirable that work performed for a delegated task be identified according to the node originally assigned the task. The problem with masquerading is that the individual identity of the node that performed the task is lost. This may be problematic if attempts are made to identify the node that performed the task. For example, when trouble shooting an error associated with the delegated task, it is important to know the identity of all nodes involved. With a common password, it is difficult to differentiate one node from another.

One example of a situation in which masquerading is often used is network node backup. Data from multiple network nodes must be backed up onto a single backup server. In most cases, access to data on a backup server is password protected for security. Generally, a predetermined set of backup nodes are given access, using a common password, to the backup server. There are several problems with this architecture.

One problem is backup process scheduling. Some backup servers, such as Tivoli™ Storage Management, use a single-tasked model. A named node can only have one backup process running at a time and only has one address for the server to contact to start a backup process. Consequently, this makes it difficult for a single task to be split up between several nodes to take advantage of delegating portions of the single task.

Another problem associated with masquerading is password management. It is difficult to distribute a common password across several nodes. In most cases, the password cannot be automatically updated upon expiration. In many cases, the password must be manually updated for each of the predetermined nodes.

As explained above, it is also difficult to determine which node was originally assigned to backup the data to be backed up and which node actually performed the backup, because of masquerading. Additionally, if an error occurs, it is extremely difficult to trace the source of the error, because under masquerading, the identities of the nodes performing the tasks are hidden due to the shared password and log-in ID.

From the foregoing discussion, it should be apparent that a need exists for an apparatus, system, and method that establish an agency relationship to perform delegated computing tasks. Beneficially, such an apparatus, system, and method would allow for delegation of computing tasks while eliminating problems that arise from the complexities of process scheduling and authorization management.

SUMMARY OF THE INVENTION

The present invention has been developed in response to the present state of the art, and in particular, in response to the problems and needs in the art that have not yet been fully solved by currently available computing task delegation techniques. Accordingly, the present invention has been developed to provide an apparatus, system, and method for establishing an agency relationship to perform a delegated computing task that overcome many or all of the above-discussed shortcomings in the art.

The apparatus to establish an agency relationship to perform delegated computing tasks is provided with a logic unit containing a plurality of modules configured to functionally execute the necessary steps of initiating an agency relationship between an independent agent and a principal to perform a delegated computing task, establishing credentials of the agent to perform the delegated computing task on behalf of the principal, and performing the delegated computing task of the agent on behalf of the principal. These modules in the described embodiments include an agent initiation module, a credentials module, and a computing module.

Preferably, the agent initiation module is configured to initiate an agency relationship between an agent and a principal to perform a delegated computing task. In one embodiment, the agent initiation module also includes a communication module configured to communicate an agency request between a first logical node representative of the principal, and a second logical node representative of the agent, and communicate acceptance of the agency request. In one further embodiment, the apparatus includes an agent delegation module configured to delegate responsibility to a second agent for performing the delegated computing task on behalf of the agent, wherein the identity of the first agent, the second agent, and the principal are recorded in association with the delegated computing task. In one embodiment, the initiation module is further configured to request a list of principals for which the agent is authorized to perform tasks.

Preferably, the credentials module is configured to establish credentials of the agent to perform a delegated computing task on behalf of the principal. In one embodiment, the credentials module also includes an authentication module configured to authorize the agent to perform delegated computing tasks with a target node, wherein the agent uses agency credentials separate from the credentials of the principal. The credentials module may also include an agent authorization module configured to authorize, with agency credentials, the agent to perform delegated computing tasks with the target node on behalf of the principal, wherein the identity of the agent and the principal are recorded in association with the delegated computing task.

Preferably, the computing module is configured to perform delegated computing tasks of the agent on behalf of the principal. In one embodiment, the computing module includes an execution module of an agent computing device configured to execute the delegated computing task in cooperation with a target node. The apparatus may also include a configuration module configured to apply configuration information to the agent that governs the delegated computing task, the configuration information corresponding to configuration information of the principal. In one embodiment, the delegated computing task is selected from a group consisting of data storage management, file management, processor load balancing, and network load balancing.

In one embodiment, the apparatus may be located on the principal. In such an embodiment, the apparatus is provided with a logic unit containing a plurality of modules configured to functionally execute the necessary steps of initiating an agency relationship between an agent and a principal to perform a delegated computing task, registering, with a designated computing device, agents authorized to perform a delegated computing task on behalf of the principal, and delegating a delegated computing task to an agent. These modules in the described embodiments include a principal initiation module, a credentials registration module, and a principal delegation module.

A system of the present invention is also presented to establish an agency relationship to perform delegated computing tasks. The system may include a principal configured to delegate a delegated computing task to an agent, a target node upon which the delegated computing task is performed, and an agent which includes an agent initiation module, a credentials module, and a computing module.

A method of the present invention is also presented for establishing an agency relationship to perform delegated computing tasks. The method in the disclosed embodiments substantially includes the steps necessary to carry out the functions presented above with respect to the operation of the described apparatus and system.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
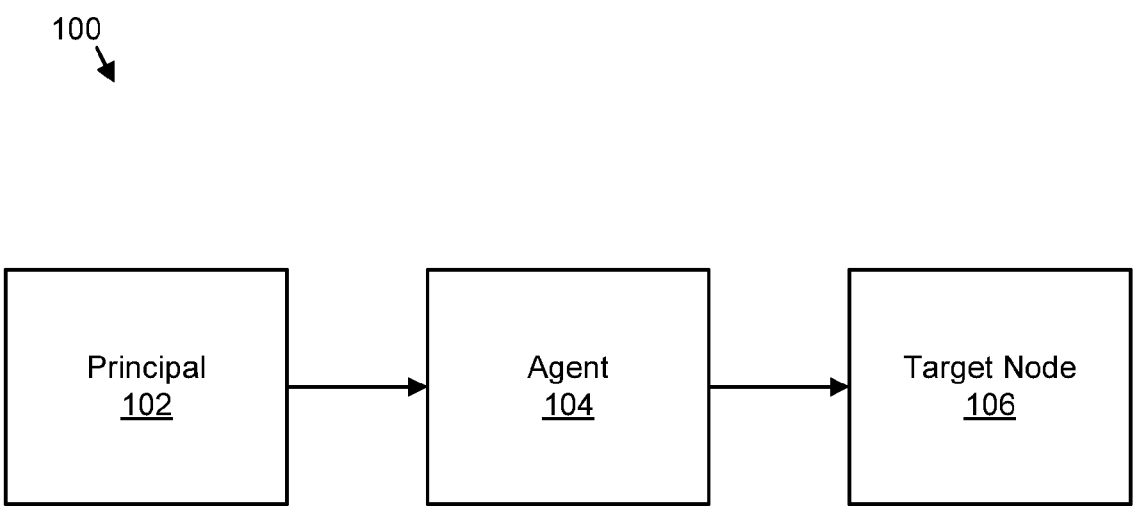
FIG. 1 is a schematic block diagram illustrating one embodiment of a system to establish an agency relationship to perform delegated computing tasks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a schematic block diagram of a system 100 for establishing an agency relationship to perform delegated computing tasks. In one embodiment, the system 100 includes a principal 102, an agent 104, and a target node 106. In such an embodiment, the principal 102 delegates a computing task to be performed in cooperation with the target node 106 to the agent 104. The agent 104 then performs the delegated computing task with the target node 106 on behalf of the principal 102.

As used herein, the term agency refers to the delegation of responsibility for performance of a specific task from a principal 102 to an agent 104. The agent 104 has the authority to associate the principal 102 with tasks performed on behalf of the principal 102 by the agent 104. In one embodiment, this association is accomplished by recording the identity of both the principal 102 with information (metadata) regarding the performed task. Such a recording may be performed by the target node 106. In this manner, the principal 102 remains accountable for the work performed for the computing task. Preferably, the identity of the agent 104 is also recorded with the metadata such that errors caused by the agent 104 can be properly traced. Additionally, once the agent 104 has accepted responsibility for performance of the task, that responsibility remains with the agent 104 until the task is complete, or the task is delegated to another agent 104.

In one embodiment, the principal 102 is a node on a network. A node may be a logical construct representative of a group of data, a network device, a cluster of network devices, or the like. In various embodiments, the principal 102 may comprise a server, workstation, database, storage disk, tape drive, or the like. In an alternative embodiment, the principal 102 may be a network routing device. In such embodiments, the principal 102 delegates some or all of the principal's work load to an agent 104. The principal 102 may actively delegate the tasks to the agent 104. Alternatively, the principal 102 may schedule with the agent 104 delegation of certain tasks in advance.

In one embodiment, the agent 104 initiates an agency relationship between the agent 104 and the principal 102, establishes credentials, and performs the delegated computing task. The agent 104 may be a server, workstation, database, storage disk, tape drive, network routing device, or the like. In one embodiment, the agent 104 accepts responsibility for performing the delegated task on behalf of the principal 102. The agent 104 may perform the computing task in communication with the target node 106. In an alternative embodiment, the agent 104 may perform a computing task locally.

In one embodiment, the target node 106 hosts the computing task performed by the agent 104. The target node 106 may be a physical computing device. Alternatively the target node 106 may be a logical group of data. One example of a target node 106 is a Tivoli™ Storage Management (TSM) system. The TSM system facilitates network data backup and restore. In one embodiment, the agent 104 may perform a backup task with the TSM system on behalf of the principal 102. In another embodiment, the agent 104 may restore data representing the principal 102 from data stored on the TSM system.

In one example of the system 100, the principal 102 may be responsible to backup a set of data on a target node 106. If the work load of the principal 102 is too great, the principal 102 may delegate a portion of the work load to an agent 104. The agent 104 then shares in the responsibility of backing up the data set on the target node 106. The principal 102 and the agent 104 preferably use independent passwords and log-in IDs to gain access to the target node 106. In this manner, the identity of both the agent 104 and the principal 102 may be stored, with the data set, on the target node 106. Backup errors may then be readily attributed to the principal 102 or the agent 104.

Figure 2:
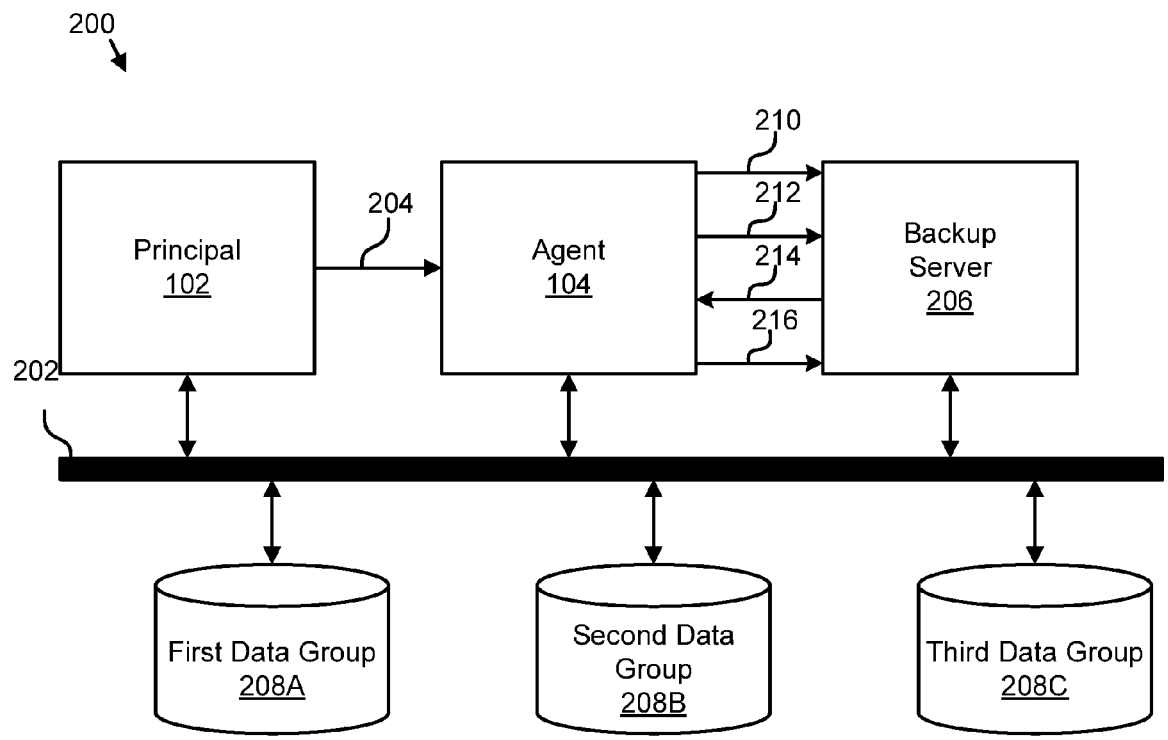
FIG. 2 is a schematic block diagram illustrating one embodiment of a system environment for establishing an agency relationship to perform delegated computing tasks.

FIG. 2 is a schematic block diagram illustrating one embodiment of a system environment 200 for establishing an agency relationship to perform delegated computing tasks. The system 200 includes a principal 102, an agent 104, a backup server 206, and data groups 208A-C. In one embodiment, the system components communicate via a communications bus 202. Additional communications may include communication of an agency request 204, agent authentication 210, agent authorization 212, application of configuration information 214, and execution of a computing task 216.

In one embodiment, the principal 102 may have the responsibility to backup data from the data groups 208A-C to the backup server 206. If the work load of the principal 102 becomes too great, the principal 104 may initiate delegation of a portion of the task. Consequently, the principal 102 may send an agency request 204 to the agent 104. In one example, the principal 102 may retain responsibility to backup the first data group 208A, and the second data group 208B, but delegate responsibility for backing up the third data group 208C to the agent 104. Accordingly, the agency request 204 includes a request to backup the third data group 208C. Preferably, the agent 104 acknowledges and accepts the request 204.

In one embodiment, the agent 104 establishes credentials to backup the third data group 208C on the backup server 206 on behalf of the principal 102. The agent 104 may log on 210 to the backup server using authentication credentials. The authentication credentials establish the identity of the agent 104. Typically, the authentication credentials comprise the agent's user-ID and password. The agent 104 may then request authorization 212 from the backup server 206 to perform the backup of the third data group 208C on behalf of the principal 102. The authorization request 212 may comprise agency credentials. Agency credentials represent an agency relationship between the principal 102 and the agent 104. The agency relationship may be predefined or dynamically defined by the principal 102 communicating with the backup server 206. Various structures may be used to represent agency credentials including a list, a stack, a queue, or the like.

In one embodiment, the backup server 206 stores agency credentials as a list of agents 104 authorized to perform computing tasks on behalf of the principal 102. The principal 102 may periodically register agents 104 authorized to perform delegated tasks. In another embodiment, the backup server 206 may send a message to the principal 102 requesting authorization for the agent 104 to perform the delegated tasks. In a further embodiment, the backup server 206 may store a lookup table of agents 104 authorized to perform tasks on behalf of certain principals 102. One benefit of authorizing an agent 104 to perform tasks on behalf of a specific principal 102, is that the identity of both the agent 104 and the principal 102 are retained in association with the delegated task.

In one embodiment, the backup server 206 may apply 214 configuration information and computing policies to the agent 104. Applying the configuration information 214 to the agent 104 imposes the same restrictions and permissions on the agent 104 that the principal 102 would have. Restricting the agent 104 in this manner ensures that unshared data does not get recorded in a shared storage space. Application of the configuration information 214 also maintains security by ensuring that the agent 104 does not access data that the principal 102 is not authorized to access, thereby maintaining consistency.

In such an embodiment, the agent 104 performs 216 the backup of the third data group 208C upon successful authorization 212 and application 214 of configurations. If an error occurs during the backup of the third data group 208C, the identity of the third data group 208C, the agent 104, and the principal 102 are known. Beneficially, the problem could be traced back throughout the chain to identify the source of the error.

Figure 3:
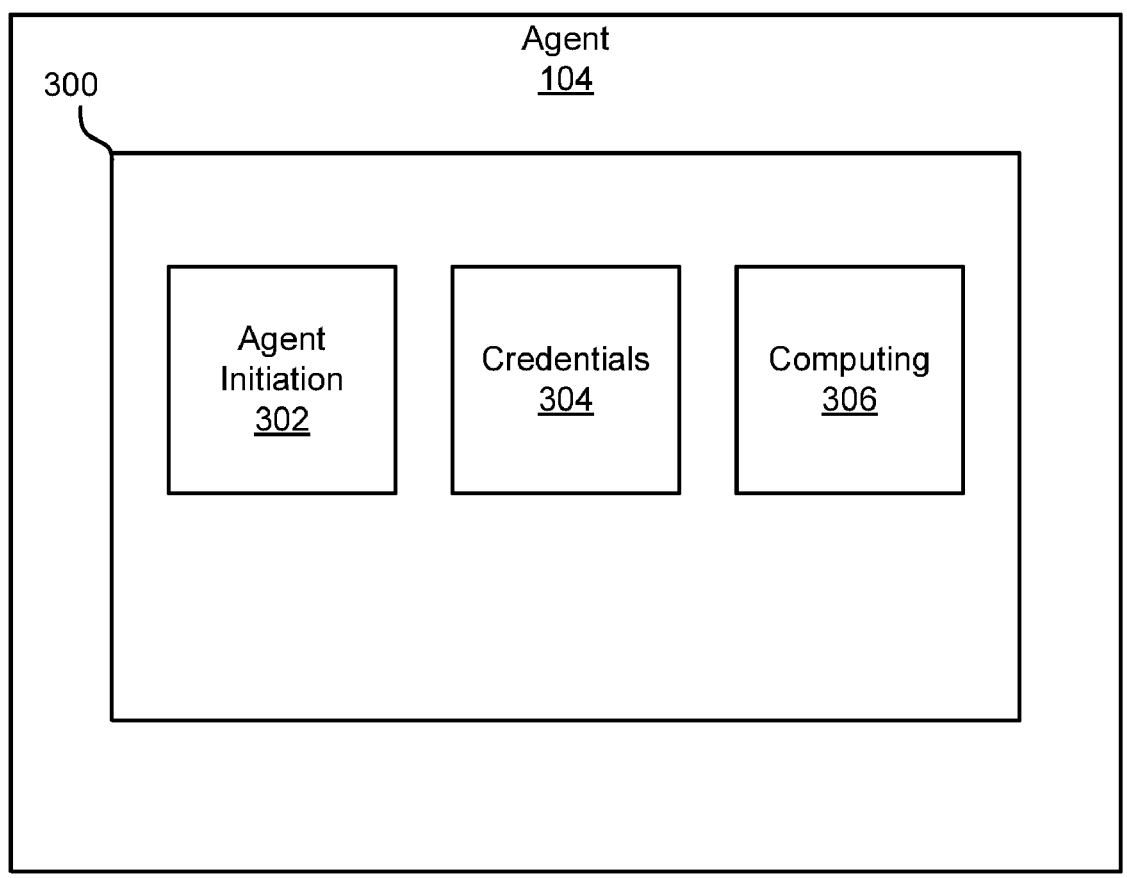
FIG. 3 is a schematic block diagram illustrating one embodiment of an apparatus to establish an agency relationship to perform delegated computing tasks.

FIG. 3 is a schematic block diagram illustrating one embodiment of an apparatus 300 to establish an agency relationship to perform delegated computing tasks. In one embodiment, the apparatus 300 is located on an agent 104. The apparatus 300 includes an agent initiation module 302, a credentials module 304, and a computing module 306. In an alternative embodiment, the apparatus 300 may comprise a separate device in communication with the agent 104.

In one embodiment, the agent initiation module 302 initiates an agency relationship between an agent 104 and a principal 102 to perform a delegated computing task. The agent initiation module 302 may initiate the relationship responsive to a request message from the principal 102. In an alternative embodiment, the agent initiation module 302 may initiate the relationship according to a predetermined schedule. Alternatively, the agent 104 may request a list of principals 102 for which the agent is authorized to perform tasks. The list may be collocated with the authorization information on the server 106. In such an embodiment, the agent 104 initiates delegation of tasks with any of the principals 102 on the list.

In another alternative embodiment, the agent initiation module 302 may initiate the relationship responsive to a threshold set for the principal 102. One example of a threshold may be a data quantity threshold. If the principal 102 processes a predetermined quantity of data, the agent initiation module 302 may initiate the agency relationship. Another example may be a processor usage threshold. Alternatively, if the agent 104 has a low work load, the agent initiation module 302 may initiate an agency relationship for work load balancing with a principal 102.

In one embodiment, the credentials module 304 establishes credentials of the agent 104 to perform a delegated computing task on behalf of the principal 102. The credentials module 304 may provide a password or set of passwords and user-IDs to identify the agent 104 and authorize the agent 104 to perform tasks on behalf of the principal 102. Alternatively, the credentials module 304 may use a network identifier, such as a hardware address of the agent 104, as the credentials for the agency relationship. In one embodiment, the agent 104 may contain a lookup table of principals for which the agent 104 is authorized to perform tasks.

In one embodiment, the computing module 306 performs a delegated computing task of the agent 104 on behalf of the principal 102. In one embodiment, the computing module 306 may communicate with a target node 106 to perform the computing task. In another embodiment, the computing module 306 may communicate with other nodes in a network via a communications bus 202 (see FIG. 2). Alternatively, the computing module 306 may perform computations locally and communicate the results to the target node 106.

One example of a computing module 306 is a processor on a server. The processor may perform calculations on data on behalf of a principal 102 and communicate the results to a target node 106. Another example computing task is a backup operation. The computing module 306 may collect the data from the data group 208C and place data in a specified location on a backup server 206 (see FIG. 2).

Figure 4:
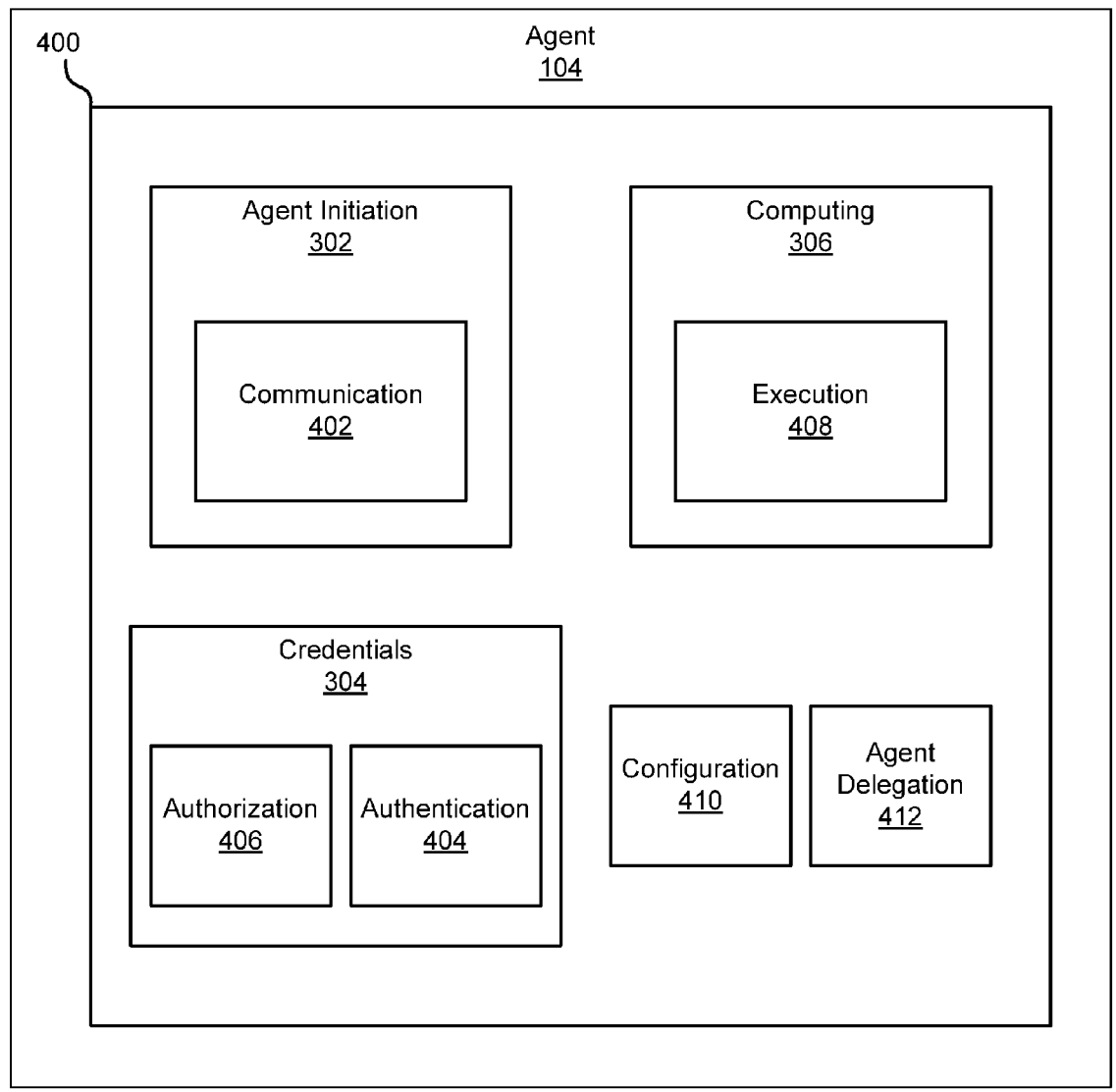
FIG. 4 is a detailed schematic block diagram illustrating one embodiment of an apparatus to establish an agency relationship to perform delegated computing tasks.

FIG. 4 is a detailed schematic block diagram illustrating one embodiment of an apparatus 400 to establish an agency relationship to perform delegated computing tasks. The apparatus 400 may be located on the agent 104. In one embodiment, the apparatus includes the agent initiation module 302, credentials module 304, and computing module 306. Additionally, the apparatus may include a communication module 402, an authentication module 404, an authorization module 406, an execution module 408, a configuration module 410, and an agent delegation module 412.

The agent initiation module 302 may include a communication module 402. Once the agent initiation module 302 initiates a request 204 for an agency relationship, the communication module 402 communicates the agency request 204. In one embodiment, the agency request 204 is communicated to the principal 102. In an alternative embodiment, the communication module 402 may receive an agency request 204 from a principal 102. In such an embodiment, the agent initiation module 302 initiates the agency relationship responsive to receiving an agency request from a principal 102 via the communication module 402. In an alternative embodiment, the communication module 402 may send an agency request 204 to a principal 102 responsive to a scheduled agency initiation.

In one embodiment, the credentials module 304 includes an authentication module 404. The authentication module 404 establishes the identity of the agent 104 using credentials separate from the credentials of the principal 102. The credentials of the principal 102 are not shared or communicated to the agent 104. This maintains the integrity and security of the principal's credentials. In one example, the authentication module 404 uses a unique password and user-ID that identifies the agent 104 to logon to a server. The server recognizes the password as an identifier of the agent 104 and allows access to the agent 104. In another embodiment, the authentication module 404 uses a hardware address as authentication credentials.

The credentials module 304 may also include an authorization module 406. In one embodiment, the authorization module 406 sends an agency authorization request 212 to a target node 106. The agency authorization request 112 may include agency credentials, the identity of the principal 102, and the like. In one embodiment, the agency credential is an agency specific password. In another embodiment, the target node 106 may look up agency authorization information for the agent 104 in a local lookup table of authorized agents. Authorizing the agent 104 to perform tasks on behalf of a given principal 102 allows the agent 104 to perform the tasks as if it were the principal 102, while still maintaining security and the identity of both the agent 104 and the principal 102.

In one embodiment, the computing module 306 includes an execution module 408. The execution module 408 executes delegated tasks in cooperation with a target node 106. One embodiment of a task that may be performed by the execution module 408 is a data backup operation. In this example, the execution module 408 may execute a backup routine which copies data from a given data set to the target node 106. In alternative examples, the execution module 408 may execute computations or file transfers in cooperation with the target node 106. In another alternative embodiment, the execution module may execute an internal task and return results to a target node 106 or to the principal 102.

In one embodiment, the configuration module 410 applies configuration information. The configuration information may define computing policies and guidelines for interactions between the agent 104 and the target node 106. In one embodiment, the configuration information may restrict the actions of the agent 104 to comply with the configurations of the principal 102. In another embodiment, a set of agency configuration information may be applied. Agency configuration information may be a standard set of computing policies that all agents 104 must follow when performing tasks with the target node 106 on behalf of principals. One example of configuration information is a restriction of access to a secure area of the target node 106. An alternative example of configuration information is the data compression ratio for data backup performed by the agent 104.

There may be a need for the agent 104 to delegate the computing task to another agent 104. In one embodiment, the agent delegation module 412 may delegate the computing task to another agent 104. In one embodiment, the agent delegation module may trigger the agent initiation module 302 to initiate an agency relationship with another agent 104. Alternatively, the agent delegation module 412 may send an agency request 204 to the agent initiation module 302 of another agent 104. In one example, the agent 104 may not be authorized to perform computing tasks on a target node 106 on behalf of a principal 102. The agent delegation module 412 may delegate the task to another agent 104 that is authorized to perform the computing task. In another embodiment, the agent 104 may become heavily burdened with tasks. In such an example, the agent delegation module 412 may accept the computing task and then delegate the computing task to another agent 104 to balance the work load.

Figure 5:
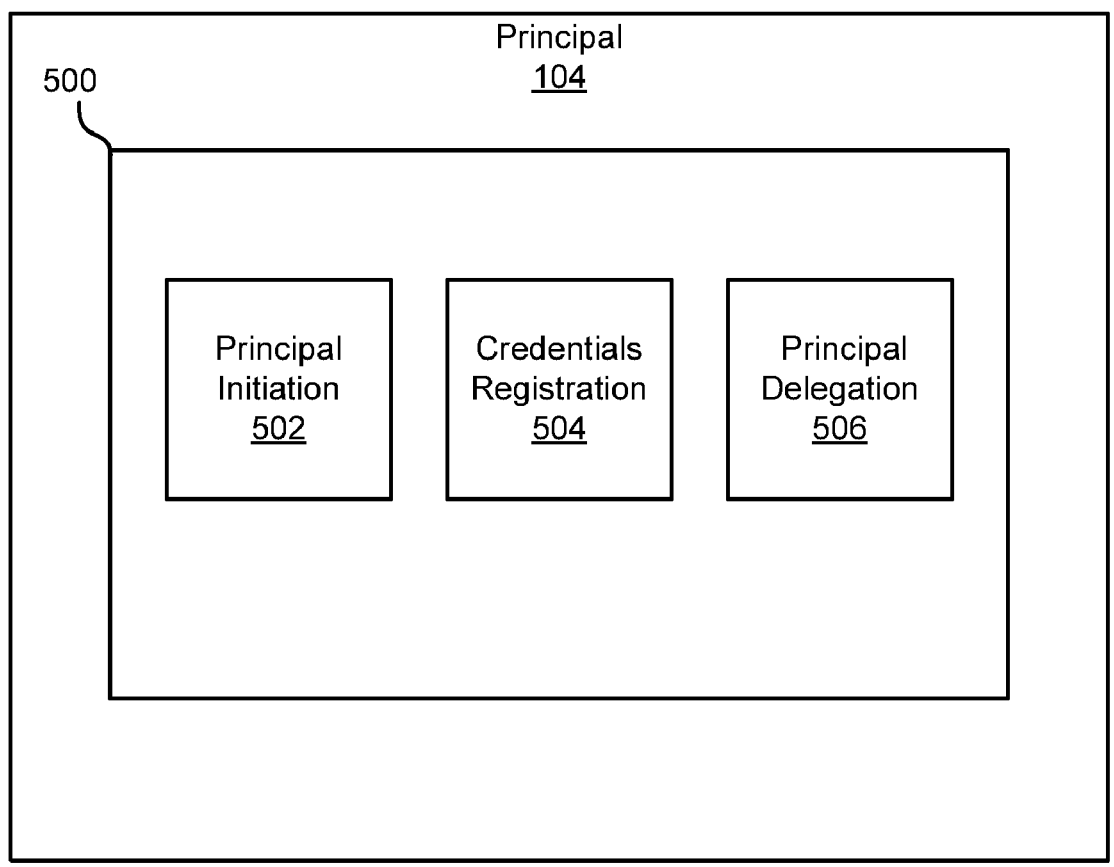
FIG. 5 is a schematic block diagram illustrating an alternative embodiment of an apparatus to establish an agency relationship to perform delegated computing tasks.

FIG. 5 is a schematic block diagram illustrating an alternative embodiment of an apparatus 500 to establish an agency relationship to perform delegated computing tasks. In one embodiment, the apparatus 500 may be located on a principal 102 node. The apparatus 500 may include a principal initiation module 502, a credentials registration module 504, and a principal delegation module 506.

In one embodiment, the principal initiation module 502 initiates an agency relationship between an agent 104 and a principal 102 to perform a delegated computing task. The principal initiation module 502 may initiate an agency relationship responsive to local thresholds including processor usage, disk volume, and the like. The principal initiation module 502 may also initiate an agency relationship responsive to a predetermined schedule. In one example, the principal initiation module 502 initiates an agency relationship with an agent 104 to balance work load due to backup tasks.

The credentials registration module 504 may register, with a designated target node 106, a list of agents authorized to perform delegated computing tasks on behalf of the principal 102. The credentials registration module 504 may periodically update a lookup table of authorized agents stored on the target node 106.

Alternatively, the credentials registration module 504 may authorize an agent 104 to perform tasks responsive to an authorization registration request from the target node 106. An authorization registration request may be sent by the target node 106 to the credentials registration module 504 responsive to an authorization request from the authorization module 406 of an agent 104. In one embodiment, the credentials registration module 504 identifies authorized agents 104 with an agency password. In another embodiment, the credentials registration module 504 identifies authorized agents 104 with a unique identifier of the agent.

In one embodiment, the principal delegation module 506 delegates a computing task to an agent 104. Delegation may include data collection, data communication, execution of an executable module, communication address redirection, and the like. In one embodiment, the principal delegation module 506 interfaces with the agent 104 to ensure complete hand-off of the computing task. The principal delegation module 506 may also manage delegated tasks. In one embodiment, the principal delegation module may request status reports from an agent 104 on the progress of a delegated computing task.

Figure 6:
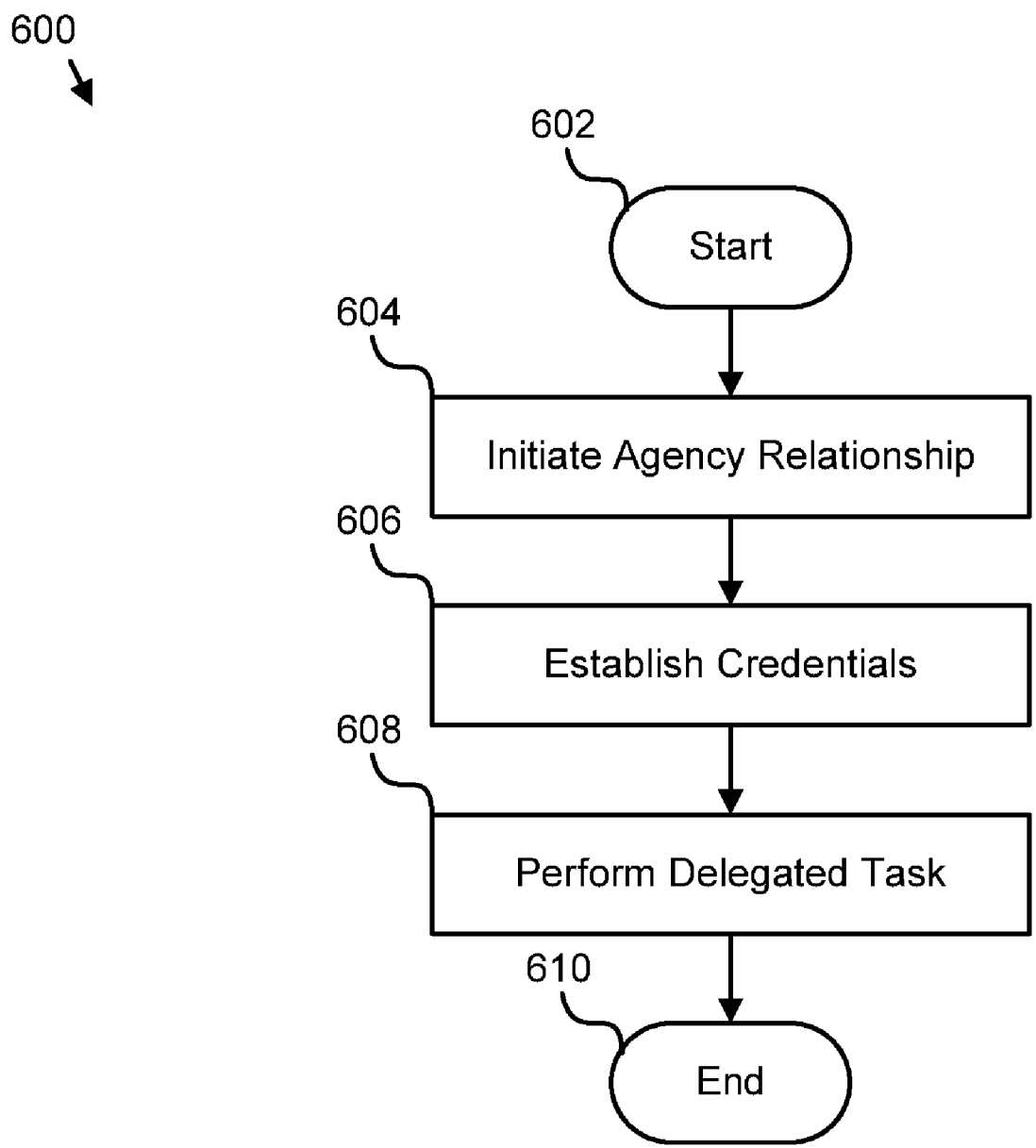
FIG. 6 is a schematic flow diagram illustrating one embodiment of a method for establishing an agency relationship to perform delegated computing tasks.

FIG. 6 is a schematic flow diagram illustrating one embodiment of a method 600 for establishing an agency relationship to perform delegated computing tasks. The method 600 starts 602 when the agent initiation module 302 or the principal initiation module 502 initiates 604 an agency relationship. In one embodiment, the credentials module 304 then establishes 606 credentials of the agent 104 to perform a delegated computing task on behalf of the principal 102. The computation module 306 may then perform 608 the delegated task in cooperation with a target node 106. The method 600 then ends 610 upon successful completion of the delegated task. One advantage of this method is that both the principal 102 and the agent 104 are separately identifiable.

Figure 7:
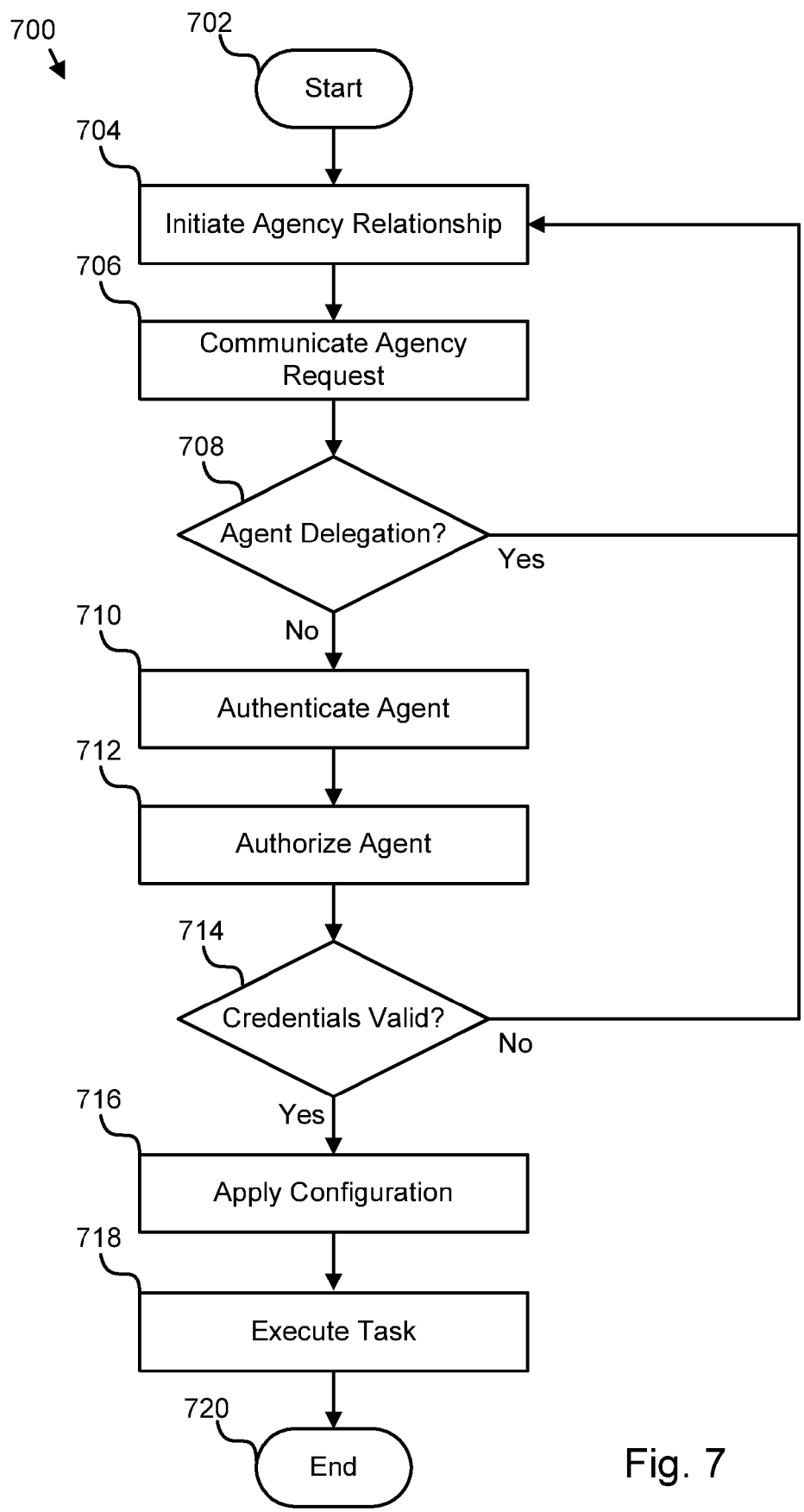
FIG. 7 is a detailed schematic flow diagram illustrating one embodiment of a method for establishing an agency relationship to perform delegated computing tasks.

FIG. 7 is a detailed schematic block diagram illustrating one embodiment of a method 700 for establishing an agency relationship to perform delegated computing tasks. The method 700 may start 702 when an agency relationship is initiated 704 by either the agent initiation module 302 or the principal initiation module 502. In one embodiment, the communications module 402 then communicates 706 an agency request 204 between the agent 102 and the principal 104. The communication module 402 may use a wired connection to communicate 706 the agency request. Alternatively, a wireless communication channel may be used to communicate 706 the agency request 204.

In one embodiment, a decision 708 is made whether to delegate to another agent 104. If the agent 104 delegates 708 to another agent 104, then another agency relationship is initiated 704 by the agent initiation module 302. The communications module 402 may then communicate 706 an agency request to the next agent 104. This process of agent delegation may continue until an agent 104 is selected that can perform the task.

In one embodiment, the authentication module 404 then authenticates 710 the agent on a target node 106. The authorization module 406 may then authorize 712 the agent 104 to perform computing tasks on behalf of the principal 102. In one embodiment, if the credentials are not valid 714, a new agency relationship may be initiated 704 and the process repeats until an agent 104 is selected with valid 714 credentials. If the credentials are valid 714, then the configuration module 410 may apply 716 an execution configuration to the agent 104. The computing task may then be executed 718 by the execution module 408, and the process ends 720. In one alternative embodiment, the agent 104 may perform several tasks on behalf of the principal 102 upon successful establishment of credentials 710, 712 with the target node 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for establishing an agency relationship to perform delegated computing tasks, the method comprising:
    initiating, use of a processor, an agency relationship between an agent and a principal to perform a delegated computing task;
    establishing agency credentials of the agent to perform the delegated computing task on behalf of the principal;
    authorizing the agent, with agency credentials that establish the agency relationship between the agent and the principal, to perform the delegated computing tasks acting as the principal;
    performing the delegated computing tasks by the agent on behalf of the principal, wherein the agent performs the delegated computing task as if the principal performed the delegated computing task; and
    recording the identity of the agent and the principal in association with the delegated computing task such that the computing tasks performed by the principal and the agent are separately identifiable.

2. The method of claim 1, wherein the method further comprises communicating an agency request between a first logical node representative of the principal, and a second logical node representative of the agent, and communicating acceptance of the agency request.

3. The method of claim 1, wherein the method further comprises executing the delegated computing task in cooperation with a target node.

4. The method of claim 1, wherein the method further comprises authenticating the agent for performing delegated computing tasks with a target node, wherein the agent uses credentials separate from the credentials of the principal, wherein credentials of the principal are not shared with the agent such that the integrity and security of the principals credentials are maintained.

5. The method of claim 1, wherein the method further comprises authorizing, with agency credentials, the agent to perform delegated computing tasks with the target node on behalf of the principal in response to receiving an agency authorization request, the agency authorization request including the agency credentials and an identity of the principal.

6. The method of claim 1, wherein the method further comprises applying configuration information to the agent that governs the delegated computing task, the configuration information corresponding to configuration information of the principal.

7. The method of claim 1, wherein the method further comprises delegating a second agent perform the delegated computing task on behalf of the agent, wherein the identity of the first agent, the second agent, and the principal are recorded in association with the delegated computing task.

8. The method of claim 1, wherein the agency relationship exists within a shared data environment selected from a group consisting of a storage area network, a shared file system, a parallel file system, a parallel database, and a clustered file system.

9. The method of claim 1, wherein the method further comprises requesting a list of principals for which the agent is authorized to perform tasks.

10. A method to establish an agency relationship to perform delegated computing tasks, the method comprising:
    initiating, by use of a processor, an agency relationship between an agent and a principal to perform a delegated computing task;
    establishing agency credentials of the agent to perform the delegated computing task on behalf of the principal;
    performing the delegated computing tasks by the agent on behalf of the principal, wherein the agent performs the delegated computing task as if the principal performed the delegated computing task; and
    recording the identity of the agent and the principal in association with the delegated computing task such that the computing tasks performed by the principal and the agent are separately identifiable.

11. The method of claim 10, wherein the method further comprises communicating an agency request between a first logical node representative of the principal, and a second logical node representative of the agent, and communicating acceptance of the agency request.

12. The method of claim 10, wherein the method further comprises authenticating the agent for performing delegated computing tasks with a target node, wherein the agent uses credentials separate from the credentials of the principal, wherein credentials of the principal are not shared with the agent such that the integrity and security of the principals credentials are maintained.

13. The method of claim 10, wherein the method further comprises authorizing, with agency credentials, the agent to perform delegated computing tasks with the target node on behalf of the principal in response to receiving an agency authorization request, the agency authorization request including the agency credentials and an identity of the principal.

14. The method of claim 10, wherein the method further comprises applying configuration information to the agent that governs the delegated computing task, the configuration information corresponding to configuration information of the principal.

15. The method of claim 10, wherein the method further comprises delegating a second agent perform the delegated computing task on behalf of the agent, wherein the identity of the first agent, the second agent, and the principal are recorded in association with the delegated computing task.

16. A method to establish an agency relationship to perform delegated computing tasks, the method comprising:
    initialing, by use of a processor, an agency relationship between an agent and a principal to perform a delegated computing task;
    delegating a computing task performable by the principal to the agent;
    authorizing the agent, with agency credentials that establish the agency relationship between the agent and the principal, to perform the delegated computing tasks acting as the principal;
    performing the delegated computing tasks by the agent on behalf of the principal, wherein the agent performs the delegated computing task as if the principal performed the delegated computing task; and
    applying configuration information to the agent that governs the delegated computing task, the configuration information corresponding to configuration information of the principal.

17. The method of claim 16, wherein the method further comprises communicating an agency request between a first logical node representative of the principal, and a second logical node representative of the agent, and communicating acceptance of the agency request.

18. The method of claim 16, wherein the method further comprises authenticating the agent to perform delegated computing tasks with a target node, wherein the agent uses credentials separate from the credentials of the principal.

19. The method of claim 16, wherein the identity of the agent and the principal are recorded in association with the delegated computing task.

20. The method of claim 16, wherein the method further comprises applying configuration information to the agent that governs the delegated computing task, the configuration information corresponding to configuration information of the principal.

* * * * *